United States Patent
Kim

(10) Patent No.: US 10,108,877 B2
(45) Date of Patent: Oct. 23, 2018

(54) SYSTEM FOR CAPTURING PUPIL AND METHOD THEREOF

(71) Applicant: HYUNDAI MOTOR COMPANY, Seoul (KR)

(72) Inventor: Seon A Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 311 days.

(21) Appl. No.: 14/553,731

(22) Filed: Nov. 25, 2014

(65) Prior Publication Data

US 2016/0063347 A1    Mar. 3, 2016

(30) Foreign Application Priority Data

Aug. 27, 2014    (KR) ........................ 10-2014-0112418

(51) Int. Cl.
G06K 9/46    (2006.01)
G06K 9/00    (2006.01)

(52) U.S. Cl.
CPC ......... G06K 9/4661 (2013.01); G06K 9/0061 (2013.01)

(58) Field of Classification Search
CPC ....... G06K 9/0061; G06K 9/4661; G01C 3/08
USPC ........................................................ 348/78
See application file for complete search history.

(56) References Cited

U.S. PATENT DOCUMENTS

| | | | | |
|---|---|---|---|---|
| 6,095,989 A * | 8/2000 | Hay | ................. | A61B 3/0025 600/558 |
| 6,419,638 B1 * | 7/2002 | Hay | ................. | A61B 3/0025 600/558 |
| 2003/0053663 A1 * | 3/2003 | Chen | ................. | G06K 9/00281 382/117 |
| 2005/0031173 A1 * | 2/2005 | Hwang | ................. | G06K 9/00597 382/118 |
| 2006/0110008 A1 * | 5/2006 | Vertegaal | ................. | G06K 9/00604 382/103 |
| 2006/0250218 A1 * | 11/2006 | Kondo | ................. | G06K 9/00597 340/5.82 |
| 2007/0159599 A1 | 7/2007 | Yamada | | |
| 2010/0321482 A1 * | 12/2010 | Cleveland | ................. | G06F 3/012 348/78 |
| 2011/0228975 A1 * | 9/2011 | Hennessey | ................. | A61B 3/113 382/103 |
| 2011/0249868 A1 * | 10/2011 | Tsukizawa | ................. | A61B 3/113 382/103 |
| 2011/0267447 A1 * | 11/2011 | Su | ................. | A61B 5/117 348/78 |

(Continued)

FOREIGN PATENT DOCUMENTS

JP    2006-58505 A    3/2006
JP    2010-26858 A    2/2010

(Continued)

*Primary Examiner* — Behrooz Senfi
(74) *Attorney, Agent, or Firm* — McDermott Will & Emery LLP

(57) ABSTRACT

A system for extracting a pupil includes an image obtainer configured to obtain front image data of a user; an illuminator configured to provide a lighting at the time of obtaining the image data; and a pupil extractor configured to receive the image data photographed in a light strength state having a predetermined reference value or more by the illuminator and apply a thresholding process to an eye region of interest (ROI) within the image data.

14 Claims, 6 Drawing Sheets

(56) References Cited

U.S. PATENT DOCUMENTS

| | | | |
|---|---|---|---|
| 2012/0188355 A1* | 7/2012 | Omi | A61B 5/0077 348/78 |
| 2012/0212598 A1* | 8/2012 | Mowrey | A61B 3/14 348/78 |
| 2013/0148102 A1* | 6/2013 | Oggier | G01C 3/08 356/5.01 |
| 2014/0022371 A1 | 1/2014 | Huang et al. | |
| 2016/0125241 A1* | 5/2016 | Ebisawa | G06K 9/00604 348/78 |

FOREIGN PATENT DOCUMENTS

| | | |
|---|---|---|
| JP | 2010-220942 A | 10/2010 |
| JP | 4613315 B2 | 1/2011 |
| JP | 10-2011-0038568 A | 4/2011 |

* cited by examiner

SYSTEM FOR CAPTURING PUPIL AND METHOD THEREOF

CROSS-REFERENCE TO RELATED APPLICATION

This application is based on and claims the benefit of priority to Korean Patent Application No. 10-2014-0112418, field on Aug. 27, 2014 in the Korean Intellectual Property Office, the disclosure of which is incorporated herein in its entirety by reference.

TECHNICAL FIELD

The present disclosure relates to a system for capturing a pupil and a method thereof, and more particularly, to a technology capable of efficiently capturing a pupil.

BACKGROUND

Nowadays, in accordance with a development of a digital technology, technologies capable of analyzing and classifying image information into specific regions or specific portions have been developed. A face recognition technology among these analyzing technologies, which is a technology integrated with a digital camera as well as an apparatus performing a security technology, or the like, has been studied and developed in various ways from various angles.

In addition, a research into a system authenticating identity of an individual using biological characteristics such as a genetic signature, a fingerprint, a voice, a vein, a face shape, a pupil, an iris, or the like, has been actively carried out. Among these, a pupil recognition field is expected to be used the most in the future for a security system due to advantages such as a high recognition ratio, unforgeability, pattern characteristics of a large amount of data, no changing factor, and the like.

In order to implement the above-mentioned pupil recognition, an interest region is determined by extracting face and eye regions based on an image and the pupil and a lighting reflect point are then extracted from an eye interest region, thereby calculating a line of sight direction vector. However, since a computing amount of data for extracting the pupil becomes large, this process is time-consuming.

SUMMARY

The present disclosure has been made to solve the above-mentioned problems occurring in the prior art while advantages achieved by the prior art are maintained intact.

An aspect of the present disclosure provides a system for capturing a pupil capable of accurately extracting the pupil of a user and a method thereof.

According to an exemplary embodiment of the present inventive concept, a system for capturing a pupil includes: an image obtainer configured to obtain front image data of a user; an illuminator configured to provide a lighting at the time of obtaining the image data; and a pupil extractor configured to receive the image data photographed in a light strength state having a predetermined reference value or more by the illuminator and apply a thresholding process to an eye region of interest (ROI) within the image data. The thresholding process extracts pixels having intensity having a value which is less than the predetermined reference value.

The lighting strength having the predetermined reference value or more may include the lighting strength in which pixels having a pixel maximum value become 70% or more within the image data.

The pupil extractor may set pixels having the intensity having the value which is less than the predetermined reference value as "0" and set pixels having the intensity having the value which is the predetermined reference value or more as "1" at the time of applying the thresholding process to thereby convert the image data into a binary image.

The pupil extractor may extract points at which a binary value of the pixel in the binary image is changed from "0" to "1" as boundary lines.

The pupil extractor may apply a circle fitting process after extracting the boundary lines and select a boundary line closest to a circle among the boundary lines to thereby determine the boundary line closest to the circle as the pupil.

The pupil extractor may predefine the eye ROI within the image data as a fixed value.

The pupil extractor may extract the eye ROI from image data photographed in a state of a first lighting strength and apply the eye ROI to image data photographed in a state of a second lighting strength which is brighter than the first lighting strength.

The first lighting strength may include a case in which pixels having an intensity maximum value (intensity MAX) are less than 10% within the image data, and the second lighting strength may include a case in which the pixels having the intensity maximum value are 70% or more within the image data.

The system may further include a lighting controller configured to control the illuminator at the first lighting strength or the second lighting strength.

According to another exemplary embodiment of the present inventive concept, a method for extracting a pupil includes: obtaining image data in a state in which a lighting strength is set to a predetermined reference value or more; and extracting the pupil by applying a thresholding process to an eye region of interest (ROI) within the image data. The thresholding process extracts pixels having intensity having a value which is less than a predetermined reference value.

The method may further include, before the step of obtaining the image data, predefining information for the eye region of interest.

The method may further include, before the step of obtaining the image data, obtaining the image data in a state in which the lighting strength is set to a value which is less than the predetermined reference value, and then extracting information for the eye ROI from the image data obtained in a state in which the lighting strength is less than the predetermined reference value.

In the step of extracting the pupil, pixels having an intensity having a value which is less than the predetermined reference value may be determined as "0" and pixels having the intensity having the value which is the predetermined reference value or more may be determined as "1" at the time of applying the thresholding process to thereby convert the image data into a binary image.

In the step of extracting the pupil, points at which a binary value of the pixel in the binary image is changed from "0" to "1" may be extracted as boundary lines.

In the step of extracting the pupil, a circle fitting process may be applied after extracting the boundary lines and a boundary line closest to a circle among the boundary lines may be selected to thereby determine the boundary line closest to the circle as the pupil.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, the most preferred exemplary embodiments of the present inventive concept will be described in detail with reference to the accompanying drawings so that those skilled in the art may easily implement the spirit of the present inventive concept.

The present disclosure provides a technology capable of efficiently and accurately extracting a pupil by using a brightness control.

Hereinafter, exemplary embodiments of the present inventive concept will be described in detail with reference to FIGS. 1 to 4C.

Figure 1:
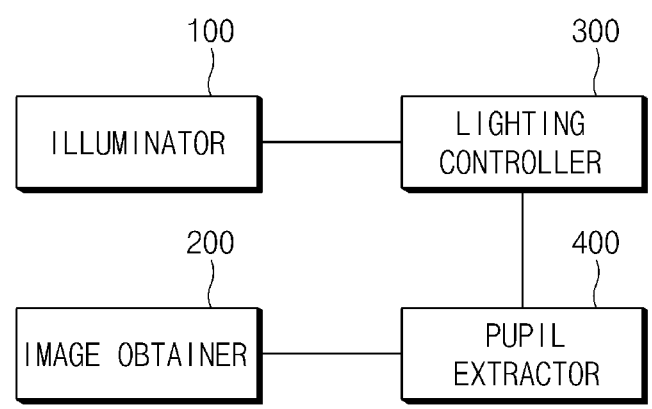
FIG. 1 is a configuration diagram of a system for capturing a pupil according to an exemplary embodiment of the present inventive concept.

FIG. 1 is a configuration diagram of a system for extracting a pupil according to an exemplary embodiment of the present inventive concept.

The system for capturing the pupil according to the exemplary embodiment of the present inventive concept includes an illuminator 100, an image obtainer 200, a lighting controller 300, and a pupil extractor 400.

The illuminator 100 may include an infrared light emitting diode (IR LED) and adjust a brightness (lighting intensity) under control of the lighting controller 300.

The image obtainer 200 includes a camera, photographs a subject (user), and transmits photographed image data to the pupil extractor 400. In this case, the camera may be attached to a cluster, while the camera may be placed in other places.

The lighting controller 300 controls an intensity of the light of the illuminator 100.

The pupil extractor 400 applies a thresholding process to an eye region of interest (ROI) within the image data obtained by the image obtainer 200 to convert it into binary image data. That is, the thresholding process checks whether or not an intensity of each pixel of the eye region of interest (ROI) is a predetermined reference value (threshold) or more, and determines pixels having the intensity which is the reference value or more as "1" and pixels having the intensity which is less than the reference value as "0", thereby generating the binary image data.

Typically, the pixel has intensities of 0 to 255, wherein as the intensity approximates to 0, the pixel approximates to a black and as the intensity approximates 255, the pixel approximates to a white. For example, in the case in which the reference value is 150, if the intensity of the pixels within the eye region of interest is 150 or more, the pixel is determined as "1", and if the intensity is less than 150, the pixel is determined as "0", such that a black portion becomes "0" and a white portion becomes "1".

Next, the pupil extractor 400 extracts points at which a binary value of the pixel in the binary image data is changed from 0 to 1 as boundary lines, applies a circle fitting algorithm to the boundary lines to select a boundary line closest to a circle among the boundary lines, thereby determining the boundary line closest to the circle as the pupil.

Hereinafter, a method for capturing a pupil according to an exemplary embodiment of the present inventive concept will be described in detail with reference to FIG. 2.

First, an eye ROI within image data is pre-defined (S101). In this case, the pre-definition of the eye region of interest means that information of the eye ROI corresponding to a position of eye within the image data photographed by the image obtainer 200 fixed to a fixed position is pre-stored. That is, the information of the eye ROI is the position information of the eye within the image data.

In this case, the user may set the camera, which is the image obtainer 200, so as to be fixedly attached to the cluster and to be automatically closed-up to the eye of the user, and may pre-set the information of the eye ROI to an initial value.

Thereafter, the lighting controller 300 adjusts a lighting of the illuminator 100 to "strong" and in a state in which the strength of the lighting is "strong," the image obtainer 200 photographs a front of the user and obtains the image data (S102). In this case, the state in which the strength of the lighting is "strong" means a case in which the number of pixels having a pixel intensity maximum value (intensity MAX: 255) within the image data occupies 70% or more of a total number of pixels.

The pupil extractor 400 converts the image data into the binary image by applying the predefined eye ROI to the obtained image data and applying the thresholding process to the eye ROI of the image data (S103).

That is, the pupil extractor 400 determines the eye ROI using the information of the eye ROI which is preset among the image data obtained by the image obtainer 200, checks whether the intensity of each pixel of the eye region of interest is the predetermined reference value (threshold value) or more to determine the pixels having the intensity which is the reference value or more as "1" and the pixels having the intensity which is less than the reference value as "0", thereby generating the binary image. In this case, portions in which the binary value is "0" are black and correspond to the pupil, and portions in which the binary value is "1" are white and correspond to a background. The above-mentioned pupil extraction may be repeatedly performed for each frame.

Next, the pupil extractor 400 extracts a boundary line from the binary image and extracts the pupil using a circle fitting (S104). That is, the pupil extractor 400 extracts points at which a binary value of the pixel in the binary image is changed from 0 to 1 as the boundary lines and applies a circle fitting algorithm to the boundary lines to select a boundary line closest to a circle among the boundary lines, thereby determining the boundary line closest to the circle as the pupil. In this case, the pupil extractor 400 may extract the pupil by calculating a coordinate of a center portion in addition to the boundary extracting method.

Figure 2:
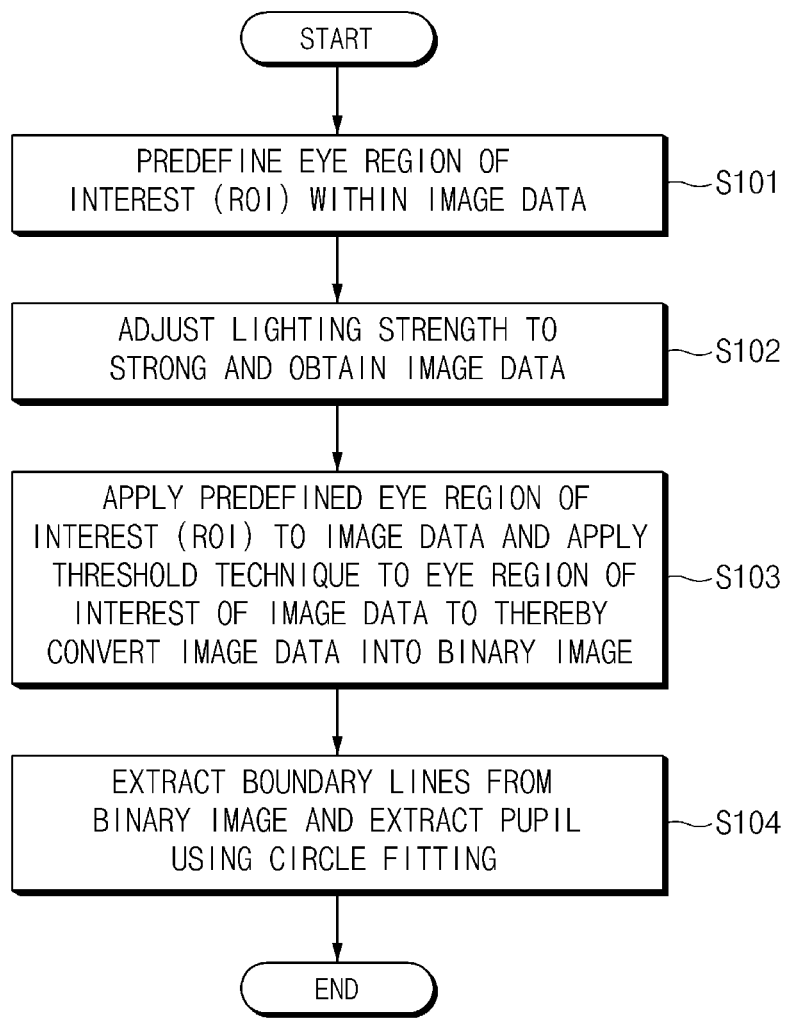
FIG. 2 is a flow chart illustrating a method for capturing a pupil according to an exemplary embodiment of the present inventive concept.

In this case, although the pupil may be extracted by performing only the step S103 of FIG. 2, an accuracy of extracting the pupil may be further improved by additionally performing the step S104. However, in the case which purports to simplify the algorithm, the step S104 may be omitted.

Hereinafter, a method for extracting a pupil according to another exemplary embodiment of the present inventive concept will be described in detail with reference to FIG. 3.

The method for extracting the pupil according to the exemplary embodiment of the present inventive concept illustrated in FIG. 2 discloses a case in which the eye ROI of the image data is predefined and the predefined eye ROI is then applied at the time of obtaining the image data later.

Figure 3:
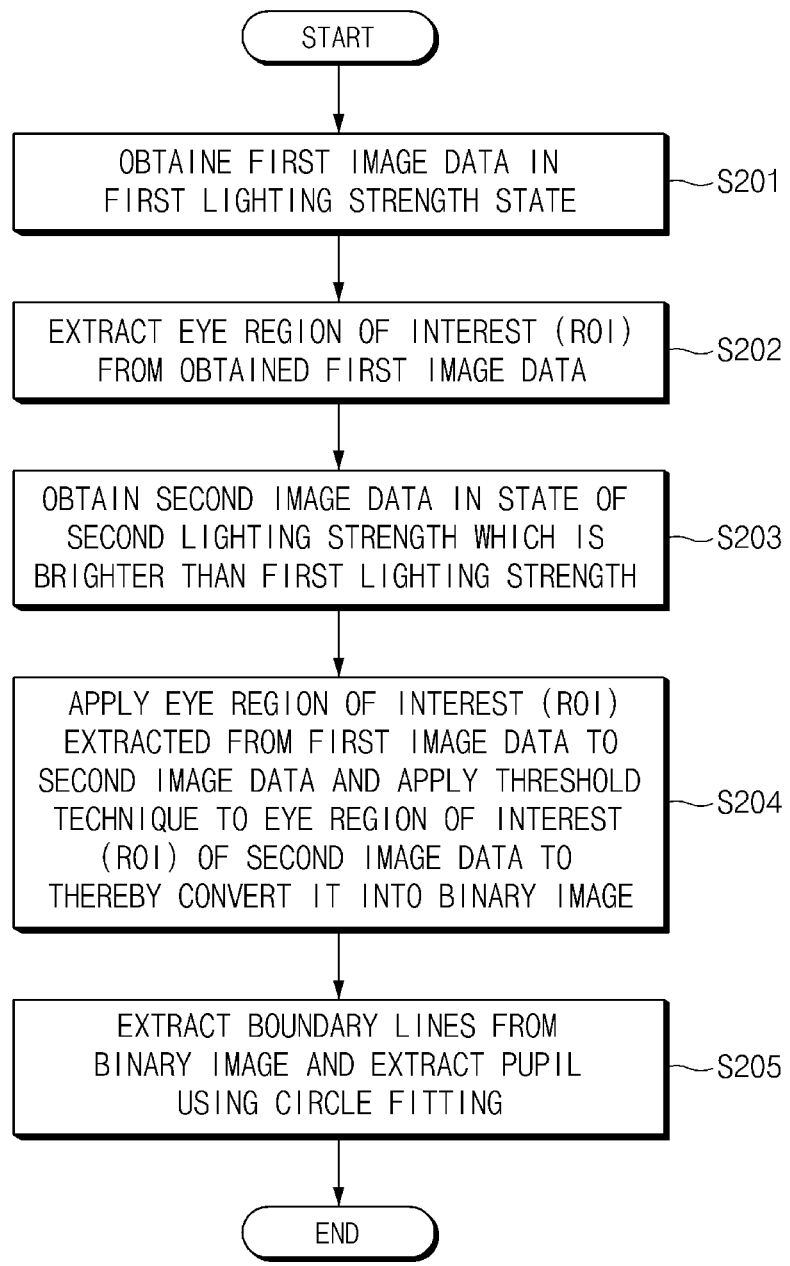
FIG. 3 is a flow chart illustrating a method for capturing a pupil according to another exemplary embodiment of the present inventive concept.

On the contrary, the method for extracting the pupil according to another exemplary embodiment of the present inventive concept illustrated in FIG. 3 discloses a technology in which the image data is obtained in a state in which the lighting strength is weak and the eye ROI is calculated from the obtained image data and is then used.

Figure 4A:
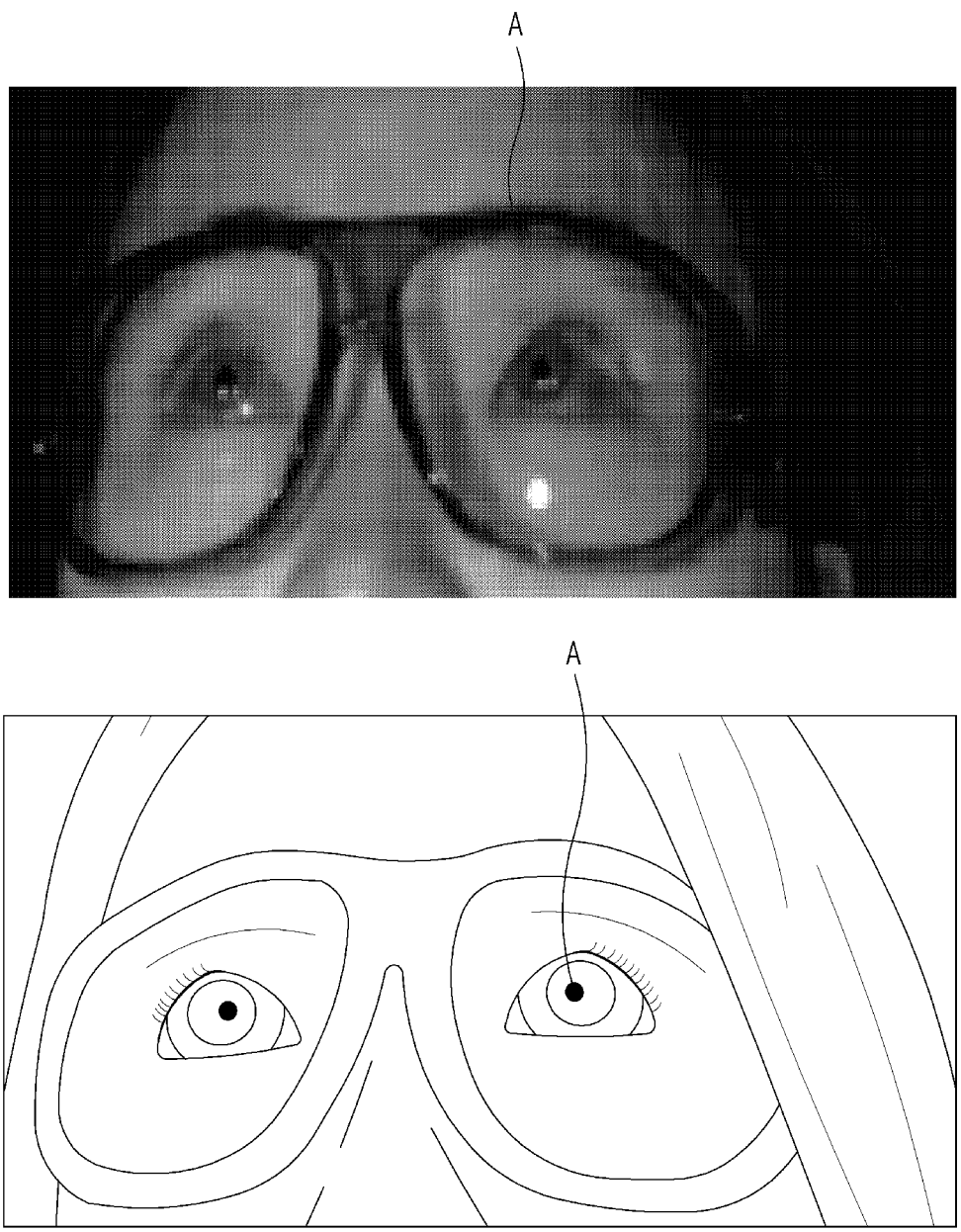
FIG. 4A is an illustrative diagram of eye image data photographed in a state in which a light intensity is "weak."

First, the image obtainer 200 obtains first image data in a first lighting strength state (S201). In this case, the first lighting strength means a case in which the number of pixels having an intensity maximum value (intensity MAX: 255) within the image data occupies 10% or less of a total number of pixels. That is, the first lighting strength means a degree in which the contour of a face including eyes, glasses, lips, and the like is indicated at the time of photographing existing general image data as illustrated in FIG. 4A.

Next, the pupil extractor 400 extracts the eye ROI from the obtained first image data (S202). That is, the pupil extractor 400 extracts position information for a region in which the eyes are positioned among the first image data. In this case, in the case in which the extraction of the eye ROI fails, after the strength of the lighting is controlled to be weaker, the image is again obtained, thereby retrying the extraction of the eye ROI.

Subsequently, in a state in which the lighting controller 300 controls the lighting strength to a second lighting strength by controlling the illuminator 100, the image obtainer 200 obtains the image (S203). In this case, the second lighting strength means a case in which the number of pixels having an intensity maximum value (intensity MAX: 255) within the image data occupies 70% or more of a total number of pixels.

Next, the pupil extractor 400 applies the eye ROI extracted from the first image data to the second image data to extract the eye ROI among the second image data and applies the thresholding process to the corresponding eye ROI to convert it into the binary image (S204).

In this case, in the case in which the pupil extraction within the corresponding eye ROI fails at the time of extracting the pupil using the binary image conversion, the eye ROI may be reset by again performing S101 to S102.

Next, the pupil extractor 400 extracts boundary lines from the binary image and extracts the pupil using a circle fitting among the boundary lines (S205).

Here, the steps S204 and S205 for extracting the pupil are performed in the same way as the steps S103 and S104 in FIG. 2, and a detailed description thereof will be omitted.

As such, the present disclosure relates to a technology capable of accurately extracting the pupil using the image data photographed in a state in which the lighting strength is strong.

Figure 4B:
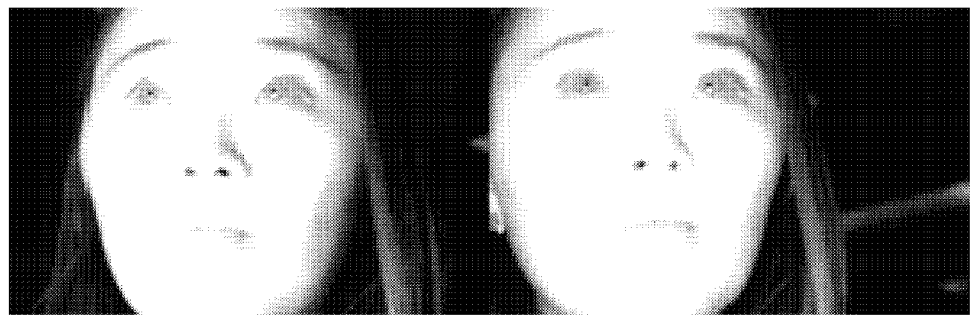
FIG. 4B is an illustrative diagram of eye image data photographed in a state in which the light intensity is "middle."
Figure 4B:

In the case in which the photographing is performed in a weak lighting strength state, the photographing is performed so that all of the eyes A, the glasses, the contour of the face, and the like of the user may be seen with the naked eye as illustrated in FIG. 4A. Meanwhile, in the case in which the photographing is performed in a middle lighting strength state, the face except for eyes, nostrils, lips of the user looks white as illustrated in FIG. 4B. In the case in which the photographing is performed in a strongest lighting strength state as illustrated in FIG. 4C, a whole face except for the pupil B and the nostrils of the user looks white.

Figure 4C:
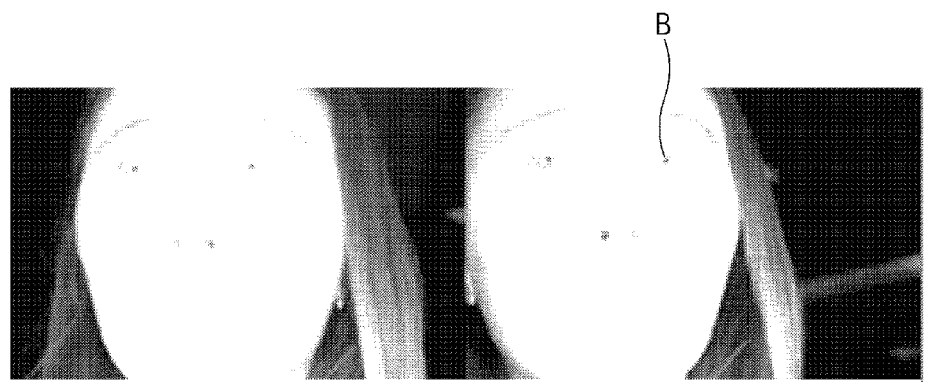
FIG. 4C is an illustrative diagram of eye image data photographed in a state in which the light intensity is "strong."
Figure 4C:
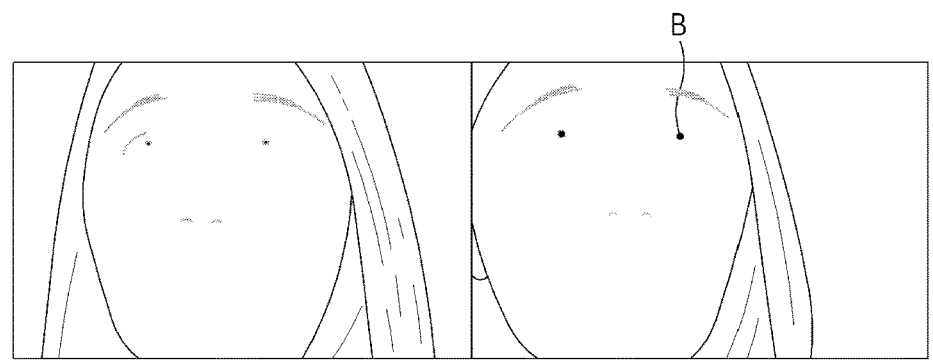
Figure 4C:
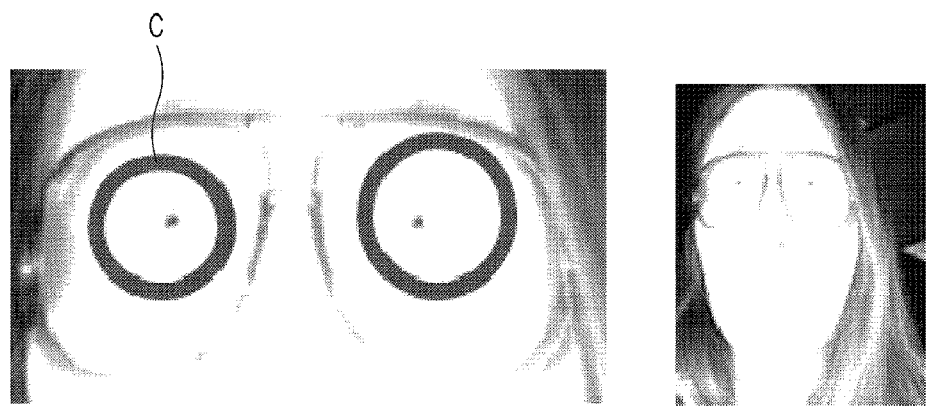
Figure 4C:
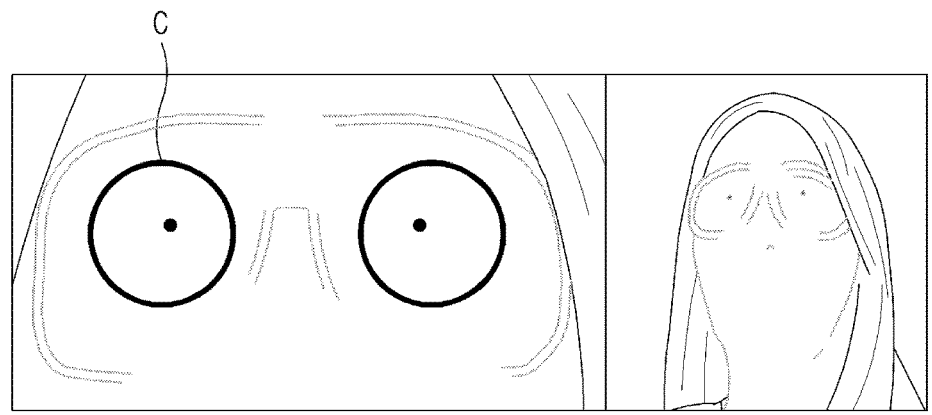

As a result, according to the present disclosure, the pupil extraction may be facilitated by minimizing the portions which look black, using the image data photographed in the strong lighting strength state as illustrated in FIG. 4C.

As described above, the present technology may increase reliability of extracting the pupil without performing a complex face recognition and eye extracting processes.

The exemplary embodiments of the present disclosure described above have been provided for illustrative purposes. Therefore, those skilled in the art will appreciate that various modifications, alterations, substitutions, and additions are possible without departing from the scope and spirit of the disclosure as disclosed in the accompanying claims and such modifications, alterations, substitutions, and additions fall within the scope of the present disclosure.

What is claimed is:

1. A system for capturing a pupil, the system comprising:
an image obtainer configured to obtain front image data of a user;
an illuminator configured to provide a lighting at the time of obtaining the image data; and
a pupil extractor configured to receive the image data photographed in a light strength state having a predetermined reference value or more by the illuminator and apply a thresholding process to an eye region of interest (ROI) within the image data, the thresholding process extracting pixels having intensity having a value which is less than the predetermined reference value,
wherein the lighting provided by the illuminator is configured such that 70% or more of pixels within the image data obtained by the image obtainer have a maximum pixel value, and
wherein the pixels having intensity less than the predetermined reference value correspond to the pupil, and the pixels having intensity equal to or more than the predetermined reference value correspond to a background.

2. The system according to claim 1, wherein the pupil extractor set pixels having the intensity having the value which is less than the predetermined reference value as "0," and set pixels having the intensity having the value which is the predetermined reference value or more as "1" at the time of applying the thresholding process to thereby convert the image data into a binary image.

3. The system according to claim 2, wherein the pupil extractor extracts points at which a binary value of the pixel in the binary image is changed from "0" to "1" as boundary lines.

4. The system according to claim 3, wherein the pupil extractor applies a circle fitting process after extracting the boundary lines and selects a boundary line closest to a circle among the boundary lines to thereby determine the boundary line closest to the circle as the pupil.

5. The system according to claim 1, wherein the pupil extractor predefines the eye region of interest (ROI) within the image data as a fixed value.

6. The system according to claim 1, wherein the pupil extractor extracts the eye ROI from image data photographed in a state of a first lighting strength and applies the eye ROI to image data photographed in a state of a second lighting strength which is brighter than the first lighting strength.

7. The system according to claim 6, wherein the first lighting strength is a lighting strength under which less than 10% of pixels within the image data have the maximum pixel value, and the second lighting strength is a lighting strength under which 70% or more of pixels within the image data have the maximum pixel value.

8. The system according to claim 6, further comprising a lighting controller configured to control the illuminator at the first lighting strength or the second lighting strength.

9. A method for capturing a pupil, the method comprising:
obtaining image data in a state in which a lighting strength is set to a predetermined reference value or more; and
extracting the pupil by applying a thresholding process to an eye region of interest (ROI) within the image data, the thresholding process extracting pixels having intensity having a value which is less than a predetermined reference value,
wherein the obtaining image data comprises obtaining the image data under the lighting strength being set such that 70% or more of pixels within the image data have a maximum pixel value, and
wherein the pixels having intensity less than the predetermined reference value correspond to the pupil, and the pixels having intensity equal to or more than the predetermined reference value correspond to a background.

10. The method according to claim 9, further comprising, before the step of obtaining the image data, predefining information for the eye ROI.

11. The method according to claim 9, further comprising, before the step of obtaining the image data, obtaining the image data in a state in which the lighting strength is set to a value which is less than the predetermined reference value and then extracting information for the eye ROI from the image data obtained in a state in which the lighting strength is less than the predetermined reference value.

12. The method according to claim 9, wherein in the extracting of the pupil, pixels having an intensity having a value which is less than the predetermined reference value are determined as "0" and pixels having the intensity having the value which is the predetermined reference value or more are determined as "1" at the time of applying the thresholding process to thereby convert the image data into a binary image.

13. The method according to claim 12, wherein in the step of extracting the pupil, points at which a binary value of the pixel in the binary image is changed from "0" to "1" are set as boundary lines.

14. The method according to claim 13, wherein in the step of extracting the pupil, a circle fitting process is applied after extracting the boundary lines, and a boundary line closest to a circle among the boundary lines are selected to thereby determine the boundary line closest to the circle as the pupil.

* * * * *